United States Patent [19]

Kiewit

[11] Patent Number: 5,040,409
[45] Date of Patent: Aug. 20, 1991

[54] SPRINKLER ALARM

[76] Inventor: David A. Kiewit, 2420 Seneca Ct., Palm Harbor, Fla. 34683

[21] Appl. No.: 504,387

[22] Filed: Apr. 4, 1990

[51] Int. Cl.$^5$ .............................................. G01M 3/08
[52] U.S. Cl. .................................. 73/40.5 A; 73/592; 73/40.5 R; 340/605
[58] Field of Search ............... 73/40.5 A, 592, 40.5 R; 340/605

[56] References Cited

U.S. PATENT DOCUMENTS

| | | | |
|---|---|---|---|
| 4,201,092 | 5/1980 | Dau | 73/40.5 A |
| 4,428,237 | 1/1984 | Zeger et al. | 73/592 |
| 4,609,994 | 9/1986 | Bassim et al. | 73/40.5 A |
| 4,736,763 | 4/1988 | Britton et al. | 73/40.5 R |
| 4,796,466 | 1/1989 | Farmer | 73/40.5 R |

Primary Examiner—Hezron E. Williams
Assistant Examiner—William Francos
Attorney, Agent, or Firm—David A. Kiewit

[57] ABSTRACT

An acoustic sensor and associated electronic circuitry are used to determine when a catastrophic leak (as e.g. may be caused by a sprinkler nozzle being broken off a pipe) occurs in a sprinkling system. When a catastrophic leak is detected, an alarm signal is generated and a shut-off valve may be actuated in order to prevent loss of fluid and possible damage that can occur due to localized high flow of the fluid that is being sprayed. The acoustic sensor responds to a frequency range of acoustic signals that encompasses the generally low frequency signals generated by the relatively unconstrained flow of fluid through a pipe, as well as the higher frequency signals generated by flow of fluid through one or more nozzles. Electronic signal processing means are employed to form a ratio of the acoustic power in two different frequency regions and to generate an alarm signal when flow generates an excess of low frequency acoustic power.

14 Claims, 4 Drawing Sheets

SPRINKLER ALARM

BACKGROUND OF THE INVENTION

The present invention relates generally to apparatus for automatically generating an alarm or shutting off unwanted flow in cases when a massive leak (e.g. as occurs when a sprinkler head is broken off a pipe) occurs in a sprinkling or spraying system.

Automatic sprinkling systems are commonly employed for the irrigation of agricultural crops and of decorative plantings such as lawns and golf courses. It is desirable to provide such irrigation without wasting water. In many areas, for example, water conservation regulations require that sprinkling be carried out during the evening and nighttime hours when air temperatures are lower and less water is lost to evaporation. A significant amount of spray irrigation thus occurs during time periods when it is inconvenient to monitor the progress of the operation.

A common failure mode of sprinkling systems occurs when a sprinkler nozzle and part of the riser pipe to which it is attached are broken off a feeder pipe. This commonly occurs during times when the sprinkler is not in use and an unseen riser is struck by a vehicle (e.g. a mowing machine) or kicked by a person or animal. Subsequently, when the sprinkling system is next operated, an excessive amount of water gushes from the broken riser while very little flows from other, unbroken, spray nozzles that are served by the same feeder pipe. The excessive amount of water that gushes from the broken pipe may damage plants, erode soil and, in extreme cases, such as when a broken sprayer on a highway median spouts onto a roadway, may cause a safety hazard. Further, if the sprinkler system is located in an area in which water consumption is rationed, the excessive water flow occasioned by the break in the sprinkler system may make the operator liable to penalties for exceeding his maximum allowable water consumption. Moreover, the plantings served by the unbroken sprayheads from which little water flows, will be starved for water and may be thereby harmed if the broken sprayhead is not repaired. Since automatic sprinkling system are commonly operated unattended, a broken sprayhead may not be noticed until damage to some of the plantings becomes visibly obvious.

Spraying systems that are used for purposes other than irrigation are also subject to failures caused when one of a set of spray nozzles is broken. For example, if a spray nozzle is broken from a sprinkler system used to control flammable dust on a coal conveyor, dust reduction may be inadequate and a hazardous condition may ensue.

Prior art leak detection systems measure flow rate to determine when a pipe breaks. To use a system of this sort, one must ensure that the maximum flow rate that will occur during normal sprinkling operation is substantially less than the minimum flow rate that will be found if one sprinkler nozzle is broken. This constraint is generally satisfied in irrigation sprinkler system that provide multiple spray nozzles (e.g. 5 to 10) that are controlled by a single zone valve. However, many sprinkler systems provide a multiplicity of such sprinkler zones with a single master timer that is used to schedule the sequential operation of each of the multiple zones. In multi-zone systems it is desirable, because of the cost of the leak detection and control device, to provide a single master leak detector to monitor and control flow to all of the zones controlled by a single timer. Thus, the use of a prior art leak detection and control system requires that the maximum normal sprinkling flow rate from any zone must be substantially less than the minimum flow rate that can occur if a sprinkler nozzle is broken off. Because the flow rates of sprinkler nozzles and the sizes of pipes used as feeders may vary from zone to zone, this constraint is not always satisfied. Thus, prior art leak detection methods are only applicable on systems that are designed to provide a balanced flow of water to the various zones of the system.

The use of prior art leak detection systems is further complicated by the requirement that the flow rates for normal and broken pipe situations must be determined at the time of installation and the leak detection and shutoff equipment must be calibrated at that time.

Turning away from the immediate application area of sprinkler systems, one finds that there is a substantial body of prior art on detecting leaks in piping systems by recourse to acoustic detectors. This art relies on discriminating between 'normal' sounds that are generated by fluid flowing through a pipe of some predetermined diameter and 'leak' sounds that are generated when the fluid leaks out through a small hole. Because the hole is much smaller than the pipe, the acoustic frequencies generated by flow through the hole are much higher than those generated by flow through the pipe. Thus, prior art acoustic leak detectors, beginning with the method proposed by T. J. Bell, in U.S. Pat. No. 267,825, use the presence of high frequency acoustic signals as indicative of a leak. Extraneous low frequency signals may be filtered out of the acoustic signals to enhance leak detector performance, as is taught in U.S. Pat. No. 3,413,653. A system that discriminates between various types of leaks, each of which creates a characteristic high frequency sound, is taught in U.S. Pat. No. 3,500,676.

The prior art of using acoustic means to detect large leaks in a piping system includes U.S. Pat. No. 4,736,763, wherein Britton et al teach the use of an economical piezoelectric transducer and a tunable low-pass filter, the averaged output of which is compared with threshold values that correspond to acoustic signals generated by small, low flow leaks that the system tolerates. By this means, they propose to shut down water supply systems in buildings in which a pipe has broken (e.g. an unoccupied vacation home) while tolerating minor leaks such as a dripping faucet.

SUMMARY OF THE INVENTION

The apparatus of the present invention can be combined with a shutoff valve that is actuated by suitable control apparatus whenever a broken pipe is detected.

AIMS OF THE INVENTION

It is an object of the invention to provide apparatus for detecting the occurrence of massive leaks, such as may be occasioned by a broken pipe or a maliciously removed sprinkler nozzle, in a sprinkler system.

The present invention provides apparatus and method for detecting massive leaks in a sprinkler system. The unique discovery of the present invention lies in the realization that acoustic flow status detection methods similar to prior art acoustic leak detection methods, but operated in a mode opposite to prior art teaching, can be used to detect and control leaks in a sprinkler system. The present invention provides for an acoustic leak detection method in which a massive leak is determined to occur when the ratio of high frequency acoustic power to low frequency acoustic power rises above a predetermined value.

Accordingly, the present invention is directed to an acoustic pipe flow detector associated with both high pass and low pass electronic filters and with circuitry means for determining the average acoustic power in the high frequency and low frequency bands and for forming a ratio of said power indicia. The apparatus of the present invention indicates an alarm whenever the low frequency power index is above a predetermined threshold and said ratio of power indicia exceeds a second predetermined threshold. In preferred embodiments of the present invention latching display means are provided so that the said alarm indication can be displayed after the sprinkler system has cycled to its OFF state and until such time as an operator repairs the broken pipe and resets the display. The apparatus of the present invention can be combined with a shutoff valve that is actuated by suitable control apparatus whenever a broken pipe is detected.

It is a further object of the invention to provide leak detection apparatus that can be retrofitted to an existing sprinkler system.

It is yet a further object of the invention to provide means to shut off the flow of water in an irrigation system in which at least one pipe is broken, and to provide an indication to the operator as to which zone of the irrigation system has the broken pipe.

It is a further object of the invention to provide apparatus for detecting the occurrance of massive leaks in multiple zone sprinkling systems in which the volume flow rate of fluid varies from zone to zone.

It is yet a further object of the invention to provide apparatus as part of an industrial process control system for indicating and controlling a massive leak, as may occur when a sprinkler nozzle has been broken off.

DESCRIPTION OF THE DRAWING

These and other objects and advantages of the present invention will be better understood by a consideration of the following detailed description and attached drawing wherein.

DETAILED DESCRIPTION

Figure 1:
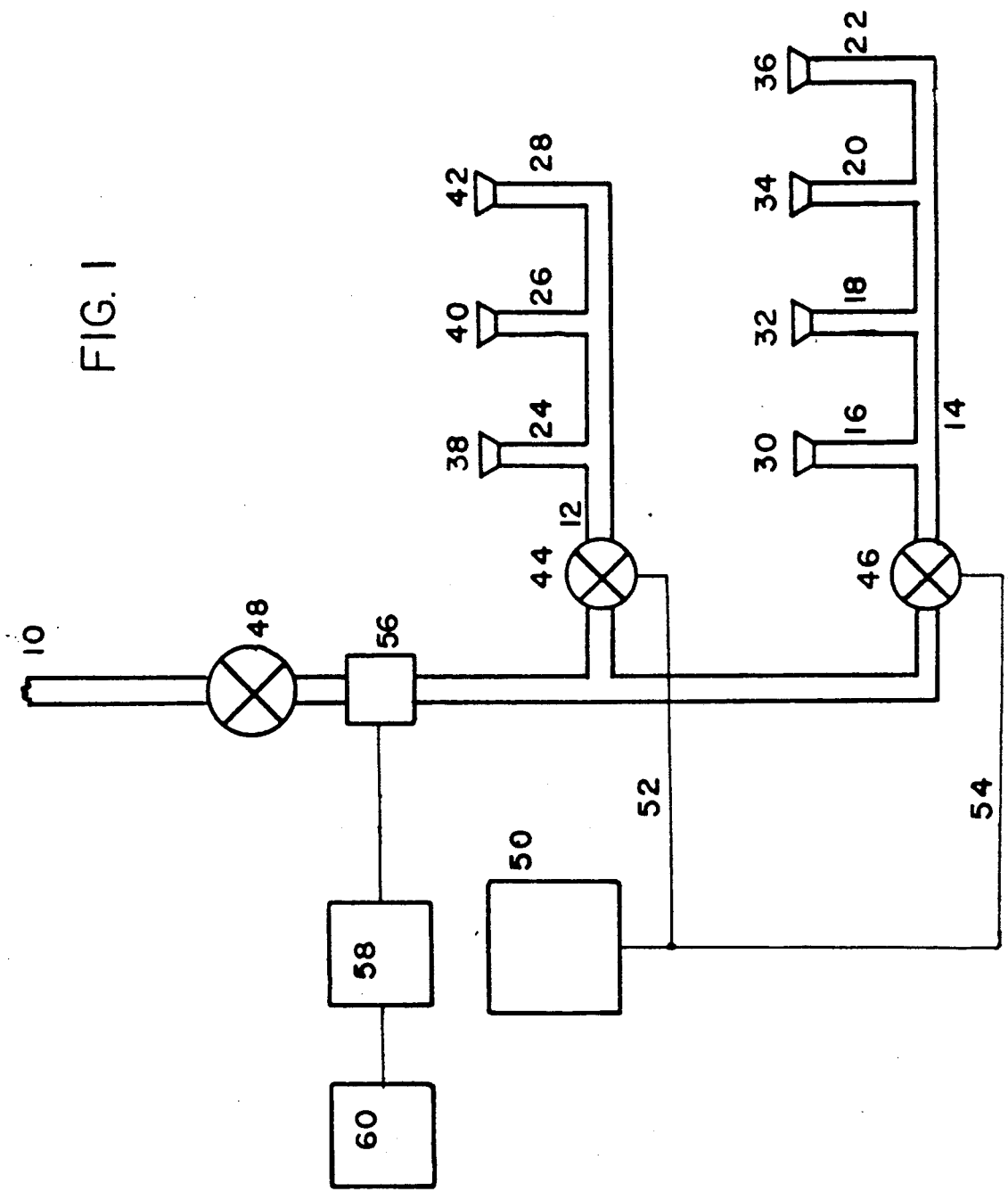
FIG. 1 is a diagram of a sprinkler system to which a broken pipe sensor and associated alarm display system are attached.

Referring now to the drawing, with particular attention to FIG. 1. there is illustrated a sprinkler system consisting of a main pipe 10, feeder pipes 12-14, riser pipes 16-28, and sprinkler heads 30-42 wherein each of the two indicated sprinkling zones is controlled by a solenoid control valve 44-46 and wherein a single main control valve 48 can be used to turn off flow to all sprinkler heads. In normal operation of this system an electric timer/controller unit 50, connected by electrical wires 52-54, is used to sequentially actuate solenoid valves 44-46 at predetermined times for predetermined intervals in order to provide irrigation. Although FIG. 1 shows a sprinkling system of only two zones, it should be understood that in many sprinkler systems four to ten such zones are served by a single main pipe.

In the version of the invention shown in FIG. 1, in which an alarm system is added to an existing sprinkler system, an acoustic sensor 56 is attached to the main pipe 10 by suitable means (e.g. adhesive bonding) for the purpose of tranducing a wide range of acoustic frequencies into electrical signals that are processed by suitable signal processing means 58, as will be discussed subsequently with reference to FIG. 3 of the drawing, and that may lead to an alarm which is then displayed on alarm indicator 60. In one embodiment, said alarm indicator is of the known 'latching' type according to which the alarm status is displayed continuously, and independently of the status of electrical power supplied to the sprinkler control system, until such time as the alarm is reset by the user.

Figure 2:
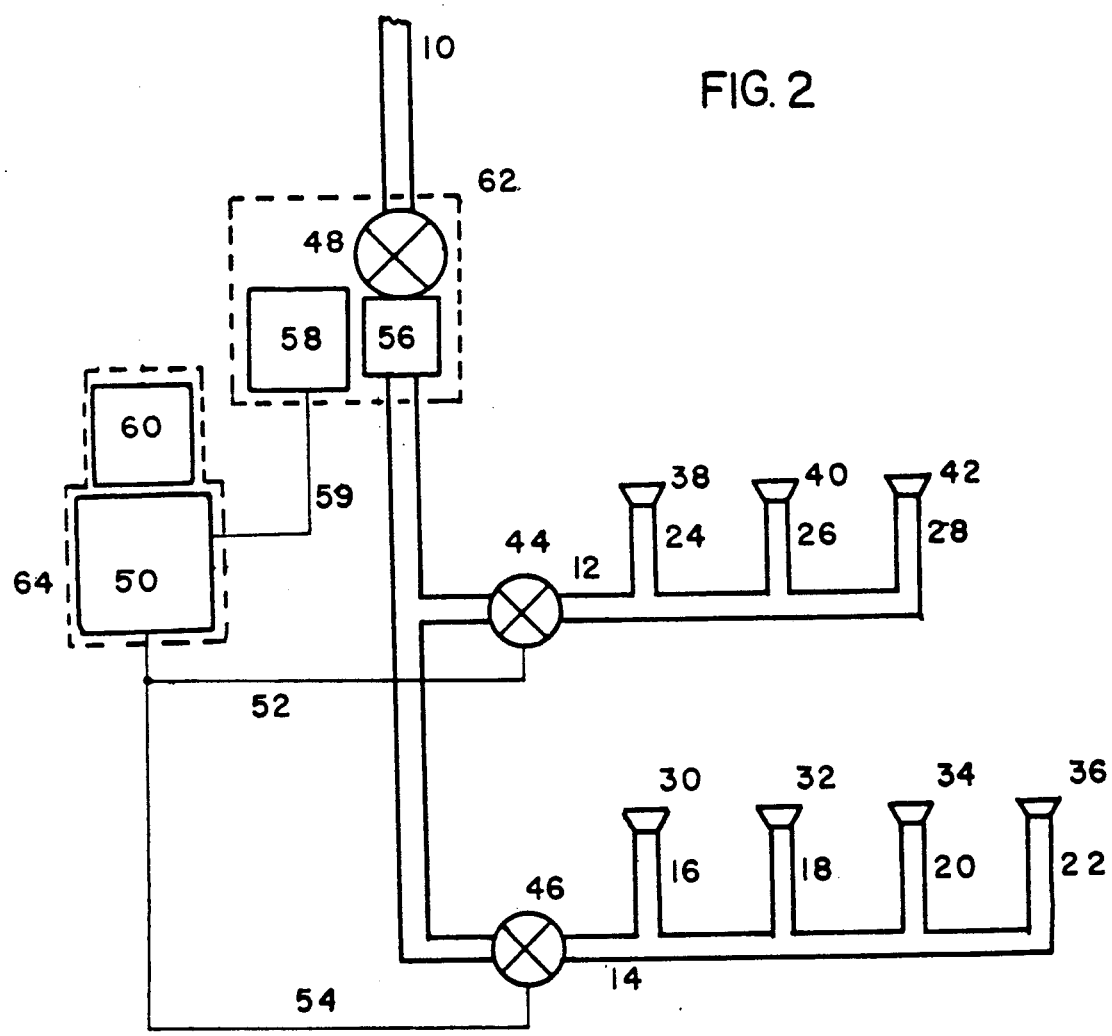
FIG. 2 is a diagram of a sprinkler system that differs from that shown in FIG. 1 in that the broken pipe sensor is built-in as part of a master control valve.

In a preferred version of the alarm system, as illustrated in FIG. 2, the acoustic transducer 56 and signal processing electronics 58 communicate with the timer/controller 50 via cable 59, and are constructed integrally with the main solenoid valve 48 into control valve assembly 62. The alarm display 60 is integrated with the timer/controller unit 50 to form a single control apparatus 64 to provide program control and alarm indications relating to the sprinkler system so that when a broken spray head is detected, flow to the entire system can be shut off by the main control valve and an indication of the zone that has failed can be posted for subsequent reading by the operator. With the exception of the aforesaid changes in the main control valve, the piping system of FIG. 2 is the same as that of FIG. 1.

Figure 3:
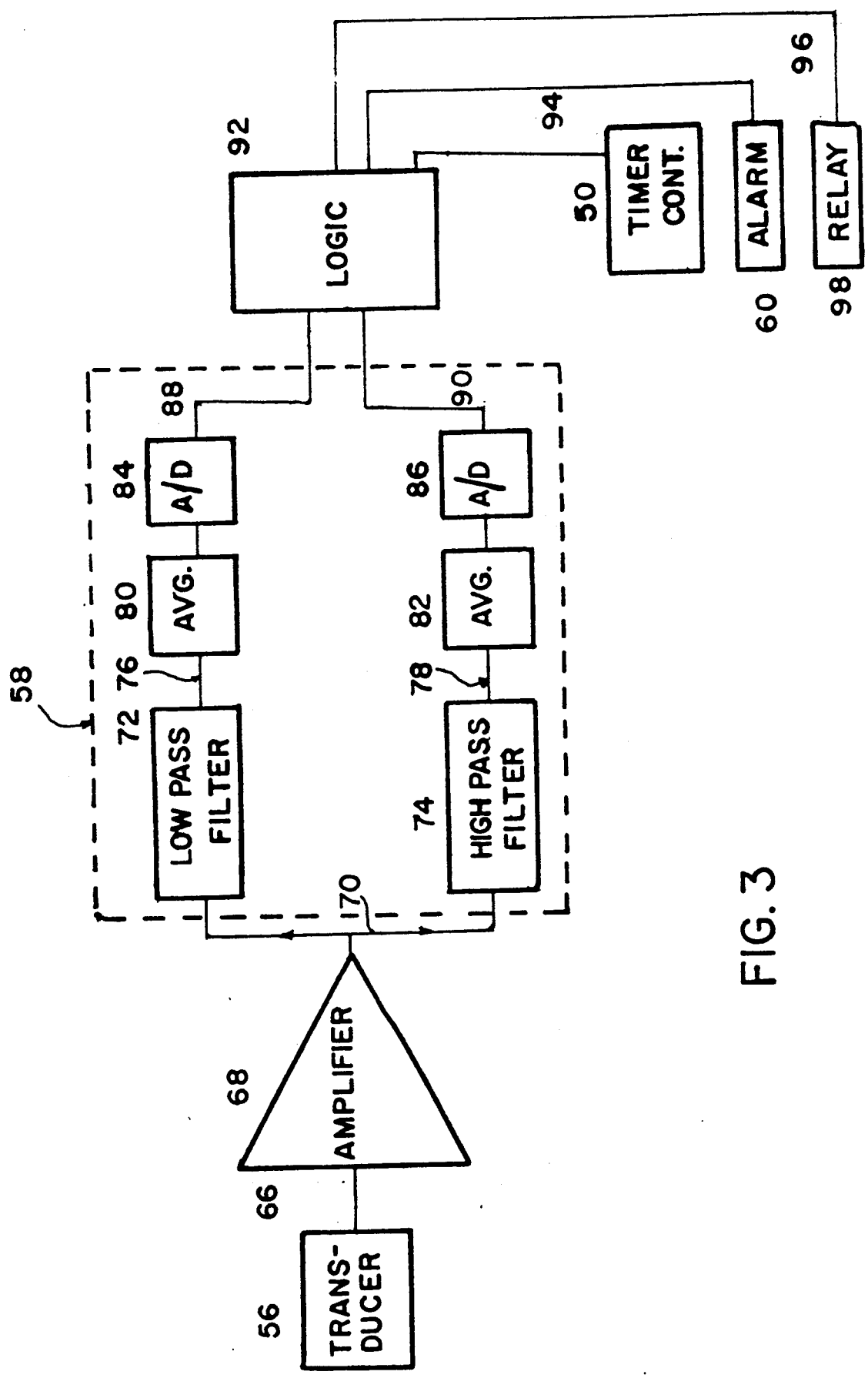
FIG. 3. is a block diagram of the acoustic signal processing and alarm generating circuitry.

The acoustic signal processing that is done by the system can be understood by referring to FIG. 3 of the drawing. Acoustic disturbances in the piping system are detected by the acoustic sensor 56 and transduced into a first electrical signal 66 which is amplified by an amplifier 68 that provides substantially uniform amplification over the frequency interval of interest, thus converting the first electrical signal 66 to a second electrical signal 70 that is applied to two parallel filters 72 and 74, where 72 is a low pass filter and 74 is a high pass filter. The electrical outputs 76-78 from the two filters are then averaged in averaging circuits 80-82, digitized by analog to digital converters 84-86 and applied as inputs 88 and 90 to logic circuitry 92. Outputs 94-96 from the logic circuit 92 are provided to an alarm indicator 60 and, in the case of the preferred embodiment of FIG. 2, to a switching device 98, which may be a relay, that is used to drive the solenoid of the master control valve, thus effectively shutting off flow of water to the zone in which a pipe is broken.

In a multi-zone sprinkler system, as illustrated in FIG. 2 of the drawing, it is desired to shut down flow in a zone whenever a pipe breaks in that zone without inhibiting operation of the sprinkler in other zones. The various zones of the sprinkler system are operated in a sequential fashion so as to provide an optimum supply of water to each sprinkler head from the water source, which is generally assumed to provide water at a known and roughly constant delivery rate. Thus, in a multizone system the test for a broken pipe needs to be made at the initiation of sprinkling in each different zone.

Figure 4:
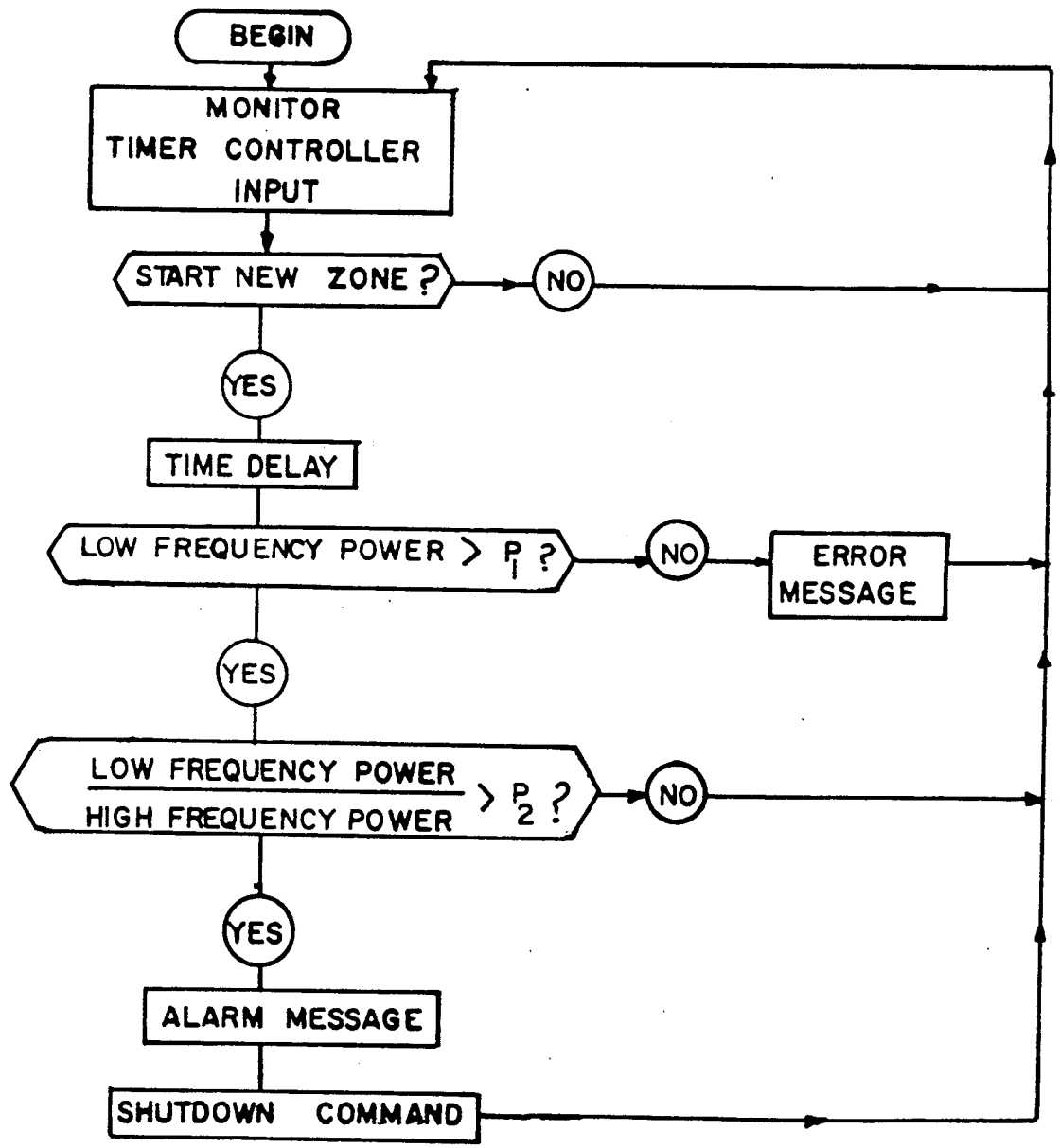
FIG. 4 is a flow chart illustrating the logical steps performed by the apparatus of FIG. 3.

The operation of logic circuit 92 is illustrated by the logic flow diagram in FIG. 4 of the drawing. The logic operation begins anew whenever the timer/controller 50 begins a period of sprinkling, or, in the case of the multizone system of FIG. 2, whenever sprinkling is begun in a new zone. A time delay is shown in flow chart of FIG. 4 to allow the pipe to fill completely, as is needed in cases where automatic drain valves (not shown in FIG. 1 or FIG. 2) are provided on each of the feeder pipes to allow complete draining of the feeder subsystem after spraying in order to prevent possible freezing damage to the sprinkler system. Subsequent to an appropriate time delay, the digitized representation of the average low frequency acoustic power 88 is compared with a predetermined threshold value to confirm that water is flowing through the pipes. If the average low frequency acoustic power does not exceed the predetermined threshold value an error message is generated. This may arise, for example, in the case of a failure of the water supply system (leading to an absence of flow) or of the transducer. The ratio of the average low frequency acoustic power 88 to the average high frequency acoustic power 90 is then compared with a second predetermined threshold value. In cases of normal operation, this ratio will be below a predetermined threshold, and the logical processor will return to the initial state and repeat the logical scan. If a pipe is broken, this acoustic power ratio will be above the predetermined threshold which will lead to the logic circuitry issuing an alarm enable command to the alarm indicator and a shutdown command to the shutdown solenoid, if the apparatus is so equipped.

Although the present invention has been described in connection with details of a preferred embodiment and of several minor modifications thereof, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. Apparatus for detecting a broken pipe in a sprinkler system comprising a source of fluid under pressure to be sprinkled, at least one pipe to transport said fluid, at least one valve for controlling flow in said pipe, and at least one sprinkler head, comprising:
    an acoustic transducer placed in acoustic contact with the pipe proximal to said valve;
    signal processing means comprising
        amplification means to amplify the output of said acoustic transducer,
        low-pass filter means attached to the output of said amplification means,
        first signal conditioning means attached to the output of said low pass filter means to derive an index of the acoustic power at frequencies below a first predetermined frequency,
        high-pass filter means, attached to the output of said amplification means,
        second signal conditioning means attached to the output of said high pass filter means to derive an index of the acoustic power at frequencies above a second predetermined frequency;
    electronic logic circuit means to calculate the ratio of said index of acoustic power at frequencies below said first predetermined frequency to said index of acoustic power above said second predetermined frequency and to generate an alarm signal if said ratio exceeds a predetermined value.

2. The apparatus as recited in claim 1 further comprising alarm display means capable of visually or audibly indicating when said alarm signal is generated during the operation of said sprinkler head.

3. The apparatus as recited in claim 2, further comprising alarm display latching means capable of maintaining said indication of alarm signal generation for an indefinite period subsequent to the termination of sprinkling.

4. The apparatus as recited in claim 1 further comprising a shutoff valve that is actuated whenever said alarm signal is generated, thus shutting off flow in said pipe.

5. The apparatus as recited in claim 1, further comprising analog to digital conversion means as part of said first and said second signal conditioning means whereby the outputs of said first and said second signal conditioning means are converted to a digital format so that said electronic logic circuit means may operate digitally.

6. The apparatus as recited in claim 5, further comprising microprocessor circuitry to provide said electronic logic circuit means.

7. Method of detecting a broken pipe in a sprinkler system comprising a source of fluid under pressure to be sprinkled, at least one pipe to transport said fluid, at least one valve for controlling flow in said pipe, and at least one sprinkler head, comprising:
    detecting an acoustic signal with an acoustic transducer placed in acoustic contact with the pipe proximal to said control valve;
    processing said acoustic signal to derive both an index of the acoustic power at frequencies below a first predetermined frequency, and an index of the acoustic power at frequencies above a second predetermined frequency;
    calculating the ratio of said index of acoustic power at frequencies below said first predetermined frequency to said index of acoustic power above said second predetermined frequency and
    generating an alarm signal if said ratio exceeds a predetermined value.

8. The method recited in claim 7 further comprising visually or audibly indicating when said alarm signal is generated during the operation of said sprinkler head.

9. The method as recited in claim 8, further comprising maintaining said indication of said alarm signal generation for an indefinite period subsequent to the termination of sprinkling.

10. The method as recited in claim 7 further comprising shutting off flow of fluid through said pipe whenever said alarm signal is generated.

11. A system for detecting a broken pipe in a sprinkler system comprising a source of fluid under pressure to be sprinkled, at least one pipe to transport said fluid, at least one valve for controlling flow in said pipe, and at least one sprinkler head, comprising:
    an acoustic transducer placed in acoustic contact with said pipe proximal to said valve and suitable to provide an electronic representation of the acoustic power spectrum in said pipe;
    signal processing means suitable to amplify the output of said acoustic transducer, and to determine the ratio of the acoustic power at frequencies below a first predetermined frequency to the acoustic power at frequencies above a second predetermined frequency and to generate an alarm signal if said ratio exceeds a predetermined value.

12. The system as recited in claim 11 further comprising alarm display means capable of visually or audibly indicating when said alarm signal is generated during the operation of said sprinkler head.

13. The system as recited in claim 12, further comprising alarm display latching means capable of maintaining said indication of said alarm signal generation for an indefinite period subsequent to the termination of sprinkling.

14. The system as recited in claim 11 further comprising a shutoff valve that is actuated whenever said alarm signal is generated, thus shutting off flow in said pipe.

* * * * *